May 16, 1961 L. R. DELLA SALLE 2,984,753
TRANSISTOR RING COUNTER
Filed Aug. 2, 1957
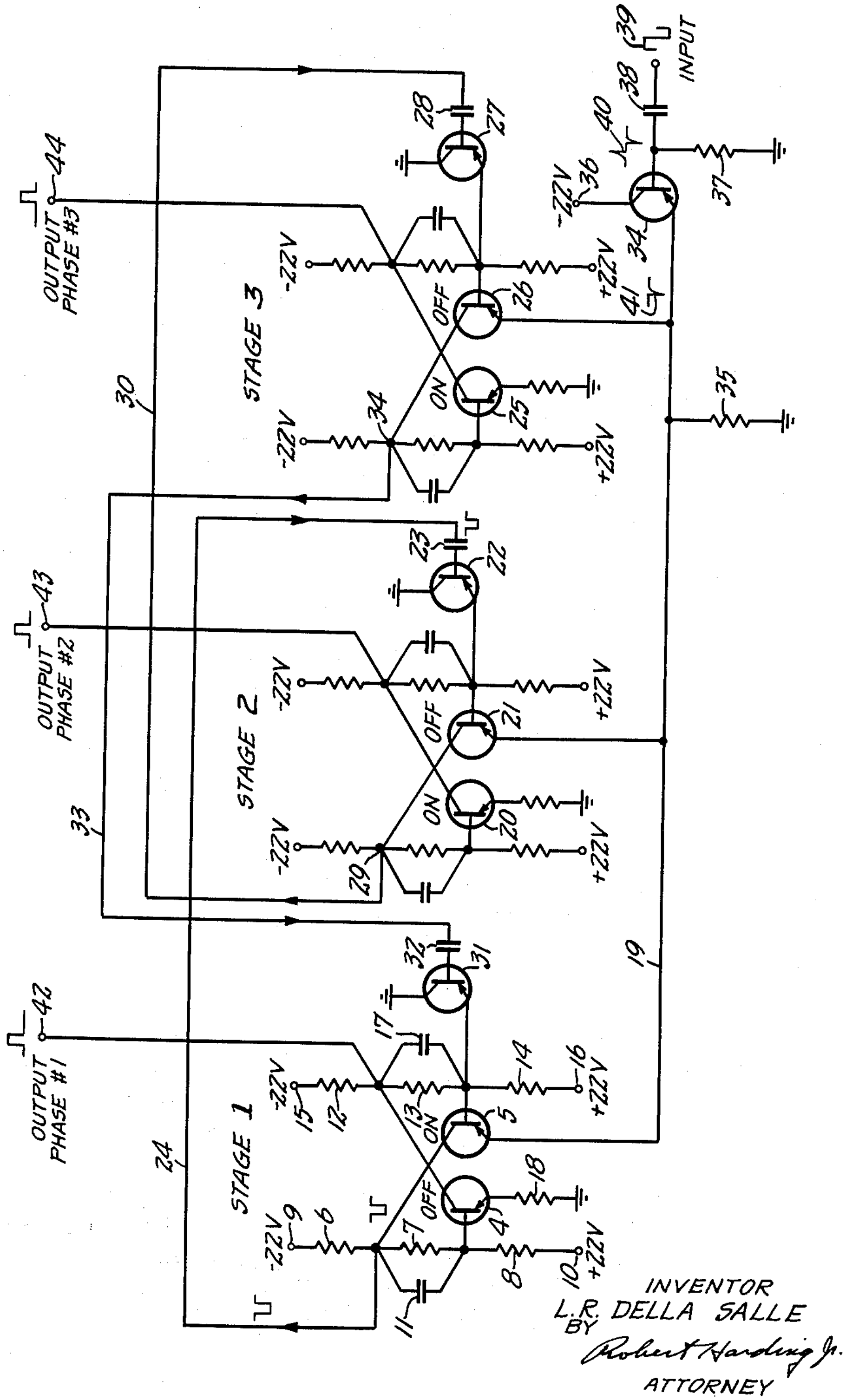
INVENTOR
L.R. DELLA SALLE
BY Robert Harding Jr.
ATTORNEY United States Patent Office 2,984,753

Patented May 16, 1961

2,984,753

TRANSISTOR RING COUNTER

Louis Robert Della Salle, Richmond Hill, N.Y., assignor to The Commercial Cable Company, New York, N.Y., a corporation of New York Filed Aug. 2, 1957, Ser. No. 675,962

6 Claims. (Cl. 307—88.5)

This invention relates to ring counters and especially to a ring counter in which the different stages comprise transistors.

One of the objects of the invention is to provide a ring counter which will operate from a relatively low voltage supply.

Another object of the invention is to provide a ring counter in which the loading of one stage on another is prevented.

Still another object of the invention is to provide a ring counter with an emitter follower circuit between every two stages to couple the stages together.

Another object of the invention is to provide a ring counter in which the range of the counting rate is increased with a minimum of deterioration of the output waveform.

Another object of the invention is to provide a ring counter with a pulse director between stages that will pass only negative pulses and only from base to emitter.

Still another object of the invention is to provide a ring counter in which spurious pulses or voltage kicks from other stages will not jeopardize the stability and reliability by feeding backwards.

The above-mentioned and other features and objects of this invention and the manner of attaining them will become more apparent and the invention itself will be best understood by reference to the following description of an embodiment of the invention taken in conjunction with the accompanying drawing, in which:

The single figure is a circuit diagram of a ring counter illustrating one embodiment of the invention.

Transistor ring counters are known, but difficulty has been experienced in coupling the stages together especially where the voltage supply is relatively low. This difficulty may be overcome by coupling the stages together with an impedance matching network called hereafter "an emitter follower."

One embodiment of the invention is illustrated in the figure in which a ring counter having three stages 1, 2, and 3, is shown. The arrangement is not limited, however, to three stages, since it is possible to use any number of stages depending on the number of pulses it is desired to count in one cycle of the counter. The stages are identical and hence it will only be necessary to describe the equipment of stage 1 in detail. The transistors used in the entire circuit are preferably of the junction P-N-P type, and as is well known, each comprises a base electrode, an emitter electrode and a collector electrode. The circuit of stage 1 comprises two transistors 4 and 5 connected as a flip-flop pair. Associated with transistor 4 is a voltage divider comprising resistors 6, 7 and 8 connected in series between a negative source of potential of approximately −22 volts, indicated at 9, and a positive source of potential of approximately +22 volts, indicated at 10. The base electrode of transistor 4 is connected to the junction of resistors 7 and 8, while a coupling capacitor 11 is connected across the resistor 7.

A similar voltage divider, comprising resistors 12, 13, and 14, is associated with the transistor 5 and is connected between a negative source of potential of approximately −22 volts, indicated at 15, and a positive source of approximately +22 volts, indicated at 16. The base of the transistor 5 is connected to the junction of resistors 13 and 14, while a coupling capacitor 17 is connected across the resistance 13.

The collector electrode of the transistor 4 is connected to the junction of resistors 12 and 13, while the collector electrode of the transistor 5 is connected to the junction of resistors 6 and 7. The emitter of the transistor 4 is connected through a resistor 18 to ground, while the emitter of the transistor 5 is connected to a common lead 19 to which a sequence of pulses is applied, in a manner to be explained, for operating the transistor ring.

Transistors 20 and 21 in stage 2 correspond to transistors 4 and 5 in stage 1, and the same arrangement of voltage dividers is provided for the transistors with similar connections. In order to couple stage 1 with stage 2, the emitter follower 22 is provided, and this may be a transistor of the same type as those already described having a base electrode, an emitter electrode, and a collector electrode. The collector electrode of the emitter-follower transistor 22 is connected to ground; the emitter is connected to the base electrode of the transistor 21; and the base electrode is connected through a coupling capacitor 23 to the junction of resistors 6 and 7 in stage 1 by means of a lead 24.

In a similar manner stage 3 of the counting ring comprises two transistors 25 and 26 which correspond to the transistors 4 and 5 of stage 1. A coupling emitter-follower transistor 27 similar to the emitter follower transistor 22 has its emitter electrode connected to the base electrode of transistor 26 and its collector electrode connected to ground, while its base electrode is connected through a coupling capacitor 28 to the junction point 29 in stage 2 by means of lead 30. The junction point 29 is on the voltage divider associated with transistor 20 and corresponds to the junction of resistors 6 and 7 in stage 1.

Similarly, the emitter follower transistor 31, of stage 1 couples stage 3 back to the stage 1. This emitter follower transistor 31 has its emitter electrode connected to the base of the transistor 5 in stage 1, while its collector electrode is connected to ground and its base electrode is connected through coupling capacitor 32 over lead 33 to the junction point 34 on the voltage divider associated with transistor 25 of stage 3, this point corresponding to the junction of resistors 6 and 7 in stage 1.

The various electrical components of each stage are selected so that the pairs of transistors, as, for instance, transistors 4 and 5 of stage 1, will each operate as a flip-flop pair having two conditions of operation. In one condition, one of the transistors is in the "on" condition with current flowing in various electrode circuits, while the other transistor is in the "off" condition with little or no current flowing. When the condition of operation shifts so that the "on" transistor is turned "off," the other transistor will be turned "on." Such a circuit adjustment for providing this particular operation is well-known. In the particular arrangement disclosed, the right-hand flip-flop transistor, for example, transistor 5 of stage 1, is the control transistor and a negative pulse applied to its emitter when the transistor is in the "on" condition will turn it "off," while a negative pulse applied to its base electrode when it is in the "off" condition will turn it "on." A negative pulse applied over the common lead 19 when the right-hand transistor is "on" will, therefore, turn it "off" and a negative pulse applied to its base electrode from the associated emitter follower circuit, for example, transistor 31 in stage 1, will turn it "on."

In the operation of the counter, the arrangement is such that a right-hand transistor is always "on" in one of the stages, while the other stages have their flip-flops in the opposite condition of operation with the right-hand transistor in the "off" condition. It will be assumed that the flip-flop circuits are in the conditions indicated in the drawing with the condition of the transistors as shown in the following table:

| Stage | Left Transistor | Right Transistor |
|---|---|---|
| 1 | Off | On. |
| 2 | On | Off. |
| 3 | On | Off. |

In order to cause the circuit to count, the common lead 19 connected to the emitter electrodes of transistor 5 and the corresponding transistors 21 and 26 in stages 2 and 3 is connected to the emitter electrode of another emitter follower transistor 34'. The common lead 19 is also connected to ground through resistor 35 which forms the common emitter resistance for transistors 5, 21, 26, and 34'. The collector electrode of the transistor 34' is connected to a negative source of potential of approximately —22 volts, indicates at 36, while the base electrode is connected to an input differentiating circuit comprising the resistor 37 which is connected between the base electrode and ground and a capacitor 38 connected between the input terminal 39 and the base electrode.

In operating the ring counter of the invention, square pulses are applied to the input terminal 39. The resistor 37 and capacitor 38 have the proper values to differentiate the square wave applied to the input terminal 39, so that a waveform of positive and negative pips, indicated at 40, is applied to the base electrode. The positive pips have no effect on the transistor 34', but the negative pips drive the emitter electrode in a negative direction with the result that negative pips, indicated at 41, appear on the common lead 19 and are, therefore, applied to the emitter electrodes of all of the transistors 5, 21, and 26.

The first negative pulse to be applied to the common lead 19 will affect only the transistor 5 which is in the "on" condition. This transistor will be shifted to its "off" condition. The effect of this shift will cause the transistor 4 to be shifted to its "on" condition because of an amplified negative pulse delivered from the collector of the transistor 5 to the base of the transistor 4 through the coupling capacitance 11. At the same time, this negative pulse, appearing at the junction of resistors 6 and 7, will be delivered over the lead 24 through the capacitance 23 to the base electrode of the emitter follower transistor 22. A negative pulse will, therefore, be applied from the emitter of this transistor to the base electrode of the transistor 21 in stage 2 which will then be shifted from its "off" to its "on" condition. The positive pulse thus produced on the collector electrode of transistor 21 will be delivered to the base electrode of the transistor 20 and will shift this transistor from its "on" condition to its "off" condition. The transistors of the counter will then have the conditions as shown in the following table:

| Stage | Left Transistor | Right Transistor |
|---|---|---|
| 1 | On | Off. |
| 2 | Off | On. |
| 3 | On | Off. |

The next negative pulse arriving over the common lead 19 will find the transistor 21 in stage 2 in the "on" condition, while the transistors 5 and 26 in the other stages are in the "off" condition. This pulse will, therefore, shift the condition of transistor 21 to its "off" condition, which, in the manner already described in connection with the operation of stage 1, will shift transistor 20 to its "on" condition and apply a negative pulse from the point 29 over the lead 30 to the base electrode of the emitter follower transistor 27 through the coupling capacitor 28. This causes the negative pulse to be applied from the emitter electrode of the emitter follower transistor 27 to the base electrode of the transistor 26 in stage 3 which shifts that transistor to its "on" condition and in turn shifts transistor 25 to its "off" condition. The condition of the transistors will then be as represented in the following table:

| Stage | Left Transistor | Right Transistor |
|---|---|---|
| 1 | On | Off. |
| 2 | On | Off. |
| 3 | Off | On. |

The next pulse will affect only transistor 26 in stage 3, causing a shift in the flip-flop pair of stage 3 and causing a negative pulse to be delivered from the base electrode of transistor 26 to point 34 and over lead 33 and coupling capacitor 32 to the base electrode of emitter follower transistor 31. A negative pulse from the emitter electrode of transistor 31 will then shift the flip-flop transistors of stage 1 into their other condition of operation. The conditions of the transistors will then appear as in the first table shown above.

An output may be taken from any or all of the stages, as desired. Thus the collectors of transistors 4, 20, and 25 may provide low impedance points from which the outputs may be taken. Connections have been shown from these points providing terminals 42, 43 and 44, these terminals being positive when the corresponding transistors 4, 20 and 25 are in their "on" condition thereby producing positive pulses in successive time periods. Such pulses may be used wherever a sequence of time position pulses are desired, such, for example as in controlling the operation of multiplex transmission circuits.

The circuit of the invention is particularly adapted to be operated on low voltage supply because of the fact that the input pulse is used to turn an "on" transistor "off" which requires a pulse of less amplitude than would be required to turn an "off" transistor "on." Also the transistor which is turned "off" delivers an amplified pulse to the emitter follower transistor of the next stage, and, therefore, this pulse does not need further amplification in order to turn "on" the transistor of the next stage.

The emitter follower circuit serves as a perfect impedance matcher between stages of the counter. Because of this impedance match there is no loading of one stage upon another, which might jeopardize the stability of the individual flip-flop pairs and thus the stability of the counting circuit. No additional limitation in counter frequency is caused by the coupling networks.

Junction type transistors are preferred because such transistors are more uniform in their characteristics and therefore will be more stable and their replacement without change in circuit components is permissible. However, other types of transistors might be used is desired. Also, while the P–N–P type of transistor is preferred, N–P–N transistors might be used, but it will be understood that reversals of the power supply connections would be necessary in that case.

The emitter follower coupler also has the advantage that all positive pulses or spurious positive kicks are suppressed in the emitter follower circuit which allows only negative pulses to pass. Thus, spurious positive pulses are prevented from interfering with the accurate operation of the counter.

A further advantage in the emitter follower coupler arises in the fact that a low impedance output point is provided so that an output from each stage may be provided to operate various other circuits without hindering the operation of the counters.

While I have described above the principles of my invention in connection with specific apparatus, it is to be clearly understood that this description is made only by way of example and not as a limitation to the scope of my invention as set forth in the objects thereof and in the accompanying claims.

What I claim is:

1. A ring counter comprising a plurality of stages of transistor pairs, circuit means for coupling the transistors of each pair together to form a flip-flop circuit with each transistor of a pair having two stable conditions of operation, and including means responsive to the shifting of one transistor from one condition of operation to the other to cause the other transistor to shift to its other condition of operation, coupling means between adjacent stages having a high impedance input connected to the output of one stage and an output connected to the input of the next succeeding stage and having an impedance matching the impedance of the input of said stage, means independent of said coupling means for applying a pulse simultaneously to corresponding transistors of all said stages, and means for causing said pulse to shift the condition of operation of any of said corresponding transistors which are in one and only one predetermined condition of operation when said pulse is applied.

2. A ring counter, as defined in claim 1, in which the coupling means comprises an emitter follower transistor with the base electrode thereof connected to the output of the previous stage and the emitter electrode connected to the input of the following stage.

3. A ring counter, as defined in claim 2, in which the means for applying a pulse simultaneously to corresponding transistors of all the stages comprises a common lead connected to the emitter electrode of a transistor of each stage and in which the base electrode of the same transistor in each stage is connected to the emitter electrode of the emitter follower transistor coupling that stage with the previous stage and the collector electrode of said same transistor in each stage is connected to the base electrode of the emitter follower transistor coupling that stage with the next succeeding stage.

4. A ring counter, as defined in claim 1, in which all the transistors are of the junction type.

5. A ring counter comprising a plurality of stages of transistor pairs, circuit means for coupling the transistors of each pair together to form a flip-flop circuit with each transistor of a pair having two stable conditions of operation, and including means responsive to the shifting of one transistor from one condition of operation to the other to cause the other transistor to shift to its other condition of operation, coupling means between adjacent stages having a high impedance input connected to the output of one stage and an output connected to the input of the next succeeding stage and having an impedance matching the impedance of the input of said stage, means for applying a pulse simultaneously to corresponding transistors of all said stages, and means for causing said pulse to shift the condition of operation of any of said corresponding transistors which are in a predetermined condition of operation when said pulse is applied, said coupling means comprising an emitter follower transistor with the base electrode thereof connected to the output of the previous stage and the emitter electrode connected to the input of the following stage, said means for applying a pulse simultaneously to corresponding transistors of all stages comprising a common lead connected to the emitter electrode of a transistor of each stage, the base electrode of the same transistor of each stage being connected to the emitter follower transistor coupling that stage with the previous stage and the collector electrode of said same transistor in each stage being connected to the base electrode of the emitter follower transistor coupling that stage with the next succeeding stage.

6. A ring counter, comprising a plurality of stages of transistor pairs, circuit means for coupling the transistors of each pair together so as to form a flip-flop circuit with each transistor of a pair having two stable conditions of operation, one in which it is conducting and one in which it is not conducting, and including means responsive to the shifting of one transistor from one condition of operation to the other to cause the other transistor to shift to its other condition of operation, means for applying operation pulses simultaneously to corresponding transistors of all said stages for causing any one of said transistors which is in its conducting condition to shift to its non-conducting condition, and means for utilizing the gain of said last-mentioned transistor to shift the corresponding transistor of the next stage of its conducting condition, said grain utilizing means comprising an emitter coupler transistor with the base electrode thereof connected to the base electrode of the first-mentioned transistor and the emitter electrode thereof connected to the base electrode of the second-mentioned next stage transistor.

References Cited in the file of this patent

UNITED STATES PATENTS

| | | |
|---|---|---|
| 2,402,432 | Mumma | June 18, 1946 |
| 2,536,916 | Dickinson | Jan. 2, 1951 |
| 2,569,345 | Shea | Sept. 25, 1951 |
| 2,594,336 | Mohr | Apr. 29, 1952 |
| 2,596,741 | Tyler et al. | May 13, 1952 |
| 2,665,845 | Trent | Jan. 12, 1954 |
| 2,766,379 | Pugsley | Oct. 9, 1956 |
| 2,848,608 | Neinburg | Aug. 15, 1958 |

OTHER REFERENCES

Convention Record of the IRE, 1954, National Convention, held March 22–25, by C. Huang et al.